United States Patent [19]

Ford

[11] Patent Number: 5,368,735
[45] Date of Patent: Nov. 29, 1994

[54] LIQUID/SOLID SEPARATOR WITH A CONDUIT BETWEEN A VORTEX AND A QUIESCENT COLLECTOR ZONE

[75] Inventor: Steven D. Ford, Clovis, Calif.

[73] Assignee: Claude Laval Corporation, Fresno, Calif.

[21] Appl. No.: 27,744

[22] Filed: Mar. 8, 1993

[51] Int. Cl.⁵ .............................................. B01D 21/26
[52] U.S. Cl. .................................. 210/512.1; 210/787; 209/733
[58] Field of Search ............... 55/459.1; 209/144, 155, 209/210, 211, 787; 210/360.1, 512.1, 512.3

[56] References Cited

U.S. PATENT DOCUMENTS

| | | | |
|---|---|---|---|
| 3,285,422 | 1/1963 | Wiley | 210/512.1 |
| 5,028,318 | 7/1991 | Aslin | 210/512.1 |
| 5,131,544 | 7/1992 | Serres et al. | 210/512.1 |
| 5,207,805 | 5/1993 | Kalen et al. | 210/512.1 |

Primary Examiner—Robert A. Dawson
Assistant Examiner—David Reifsnyder
Attorney, Agent, or Firm—Donald D. Mon

[57] ABSTRACT

A separator for separating solids from liquids in a liquid/solid mixture. The mixture is injected into a tubular separation barrel in a helical stream which flows to a spin plate. The spin plate reverses the axial direction of flow and forms a vortex whose central portion flows in the opposite axial direction. An exit port adjacent to the spin plate permits flow of solids-enriched liquid into a collection chamber. The collection chamber has a collection region below the exit port to collect solids and a quiescent zone above the exit port into which liquid relieved of much of its solids can rise. A conduit connects the quiescent region to a central point on the spin plate facing into the separation barrel to create a flow path from the quiescent zone to the separation chamber.

5 Claims, 2 Drawing Sheets

LIQUID/SOLID SEPARATOR WITH A CONDUIT BETWEEN A VORTEX AND A QUIESCENT COLLECTOR ZONE

FIELD OF THE INVENTION

Apparatus to separate solids from liquids. A vortex is formed from which an enriched mixture of liquid and solids moves into a collection chamber. The vortex has a region of lesser pressure. A conduit interconnects an upper quiescent zone in the collection chamber with the region of lesser pressure in the vortex, to enhance separation efficiency.

BACK GROUND OF THE INVENTION

The use of a vortex motion to separate solids from liquids is well-established. Classically the stream of mixed liquids and solids is injected into a separation barrel. The barrel has an interior wall which is a surface of revolution, and the stream is injected tangentially into it so flow occurs centrifugally and axially toward a spin plate, which reflects the flow in a whirling path in the reverse axial direction, thereby forming a vortex. The vortex has, at and near to the center of the spin plate, a region of lesser pressure. The reversely moving stream flows into a central outlet barrel and exits the separator.

Solid particle exit ports are located adjacent to the spin plate through which solids to be separated pass into a collection chamber. The collection chamber is relatively still, and allows solids to settle and collect. The solids are drawn off continuously or periodically. The system itself runs flooded. There are no regions occupied by gases.

This is a well-known type of separator, and functions well for many installations. However, it suffers from the fact that liquid must be displaced as solids enter the collection chamber. This is a counter-current movement through the exit ports, and as a consequence lighter and/or smaller particles may be carried into the outlet stream, thereby lowering the separation efficiency.

It is an object of this invention to improve the efficiency of this type of separator by providing a conduit for liquid to move from a quiescent zone in the collection chamber to the lesser pressure region of the vortex. As a consequence there is readier movement of solids-enriched mixture into the collection chamber, and a lesser counter current flow of liquid. The efficiency of this type of separator is substantially increased by this conduit.

BRIEF DESCRIPTION OF THE INVENTION

A liquid/solid separator according to this invention includes an inlet chamber from which a stream of mixed liquids and solids is tangentially injected into a separation barrel. The separation barrel has a peripheral wall which is a surface of revolution. The resulting spinning stream flows axially toward a spin plate, which reverses the axial direction of flow, and reflects the stream upwardly as the central part of a vortex. This central part flows through and out of a central outlet barrel. Exit ports (which may instead be a slot) adjacent to the spin plate exit into a collection chamber, in which collected solids accumulate, and from which they are removed continuously or periodically.

According to a feature of this invention, the collection chamber includes a quiescent region above the exit ports, into which liquid which accompanied the solids can rise. The liquid in this quiescent region is relatively free from solids, most of the solids having settled out. A conduit extends between the quiescent region and a vortex region of lesser pressure, which enables the clarified liquid to flow to the vortex and thereby to be returned to the exit stream. This reduces counter current flow through the exit ports, and facilitates the entry of solids into the collection chamber. The increased throughput of solids-enriched liquid/solids mixture improves the efficiency of the separator.

The above and other features of the invention will be fully understood from the following detailed description and the accompanying drawings, in which:

DETAILED DESCRIPTION OF THE INVENTION

Figure 1:
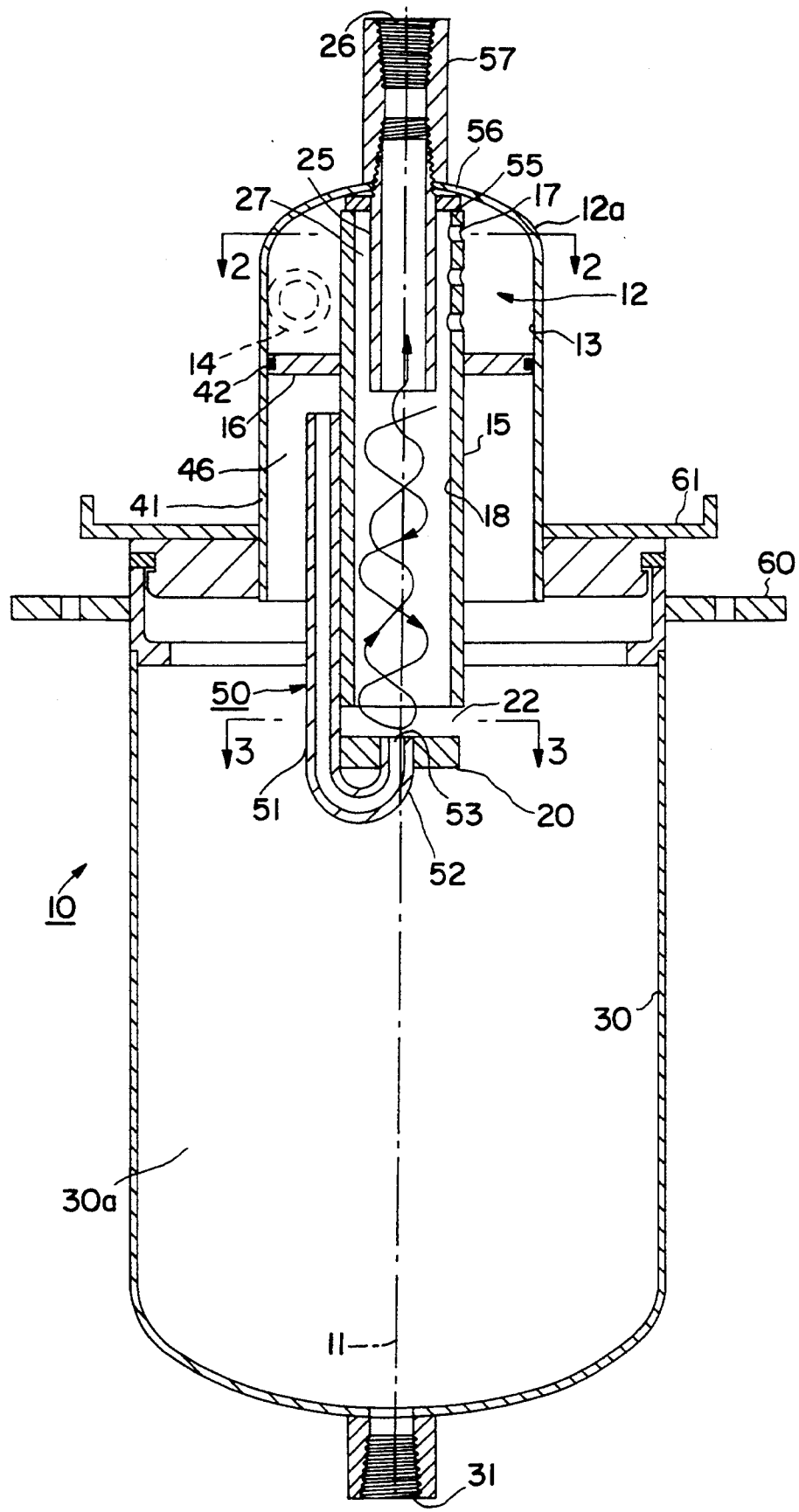
FIG. 1 is an axial cross-section of the preferred embodiment of the invention.
Figure 4:
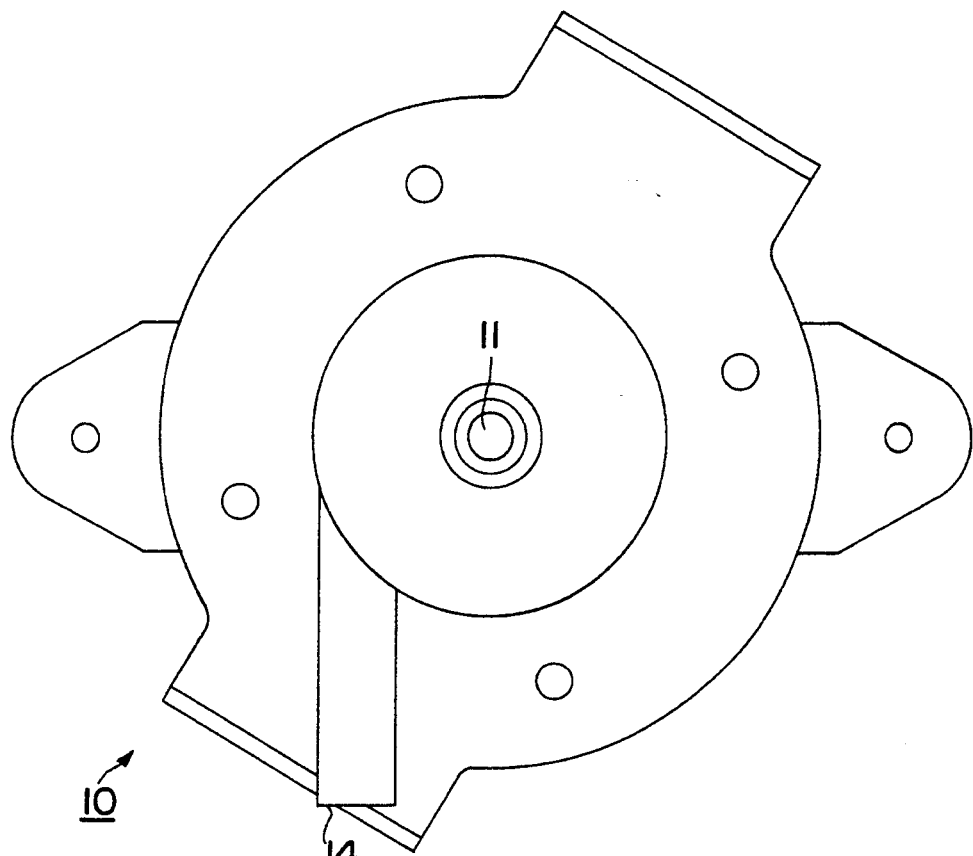
FIG. 4 is a top view of FIG. 1.
Figure 2:
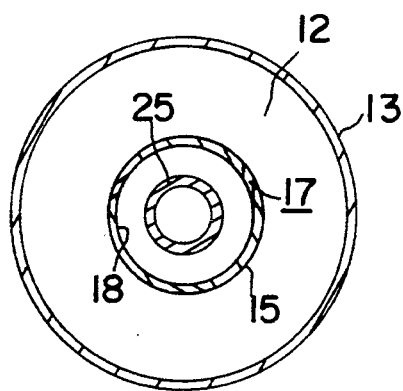
FIG. 2 is a cross-section taken at line 2—2 in FIG.
Figure 3:
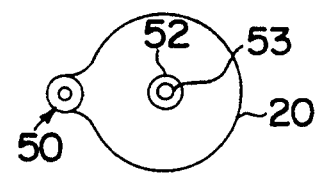
FIG. 3 is a cross section taken at line 3—3 in FIG. 1.

A liquid/solid separator 10 according to this invention is shown in FIG. 1. The separator has a central axis 11. An inlet chamber 12 formed by an inlet barrel 12a receives liquid/solid mixtures or suspensions from which the solids are to be separated. The wall 13 of the inlet chamber is preferably a surface of revolution. Inlet port 14 discharges the mixture tangentially into the inlet chamber, imparting a strong spin to the stream. In this specification the term "surface of revolution" is used in its geometric sense of a surface generated by a generator line revolved around a central axis. The surfaces referred to in the specification are not intended to rotate.

A separation barrel 15 extends axially through the inlet chamber, and extends well below it. A seal plate 16 seals between the inner wall of the inlet chamber and the outer wall of the separation barrel. Inlet orifices 17 extend through the wall of the separation barrel in the inlet chamber. Orifices 17 are tangentially oriented, and face in the direction of the spin imparted by inlet port 14 against wall 13 of the inlet chamber. Together these generate a strong spinning movement of the stream which flows around inside wall 18 of the separation barrel, and downwardly. Wall 18 is a surface of revolution, usually a cylinder.

A spin plate 20 is in axial adjacency to the lower end 21 of separation barrel 15. It extends laterally across lower end 21, and except for exit port 22 would close the lower end of the separation barrel. As illustrated, exit port 22 is a continuous slit formed by spacing the spin plate from lower end 21. If preferred, the exit port could be formed as a group of individual ports formed in the wall of the separation barrel, in which event the spin plate would close the lower end of the separation barrel. In fact, except for the continuous slit as shown, it would close it.

An outlet barrel 25 exits the separation barrel at its upper end. Fluid which has passed through the separation barrel exits through outlet 26 from the outlet barrel. The outlet barrel is also useful in forming the spinning stream from the inlet orifices, because it is aligned with them and extends part way into the separation barrel.

This provides an annular region 27 which initially radially confines the stream.

A collection chamber 30 includes a collection portion 30a below the spin plate to receive material which is passed through the exit port. A drain fitting 31 is formed in the bottom of the collection chamber. The collection chamber is shown as a rigid structure. However, a removable, replaceable flexible bag could instead be provided. The size of the collection chamber will in part be determined by the amount of solids to be collected before removal, or whether removal will be continuous. In any event, it should be large enough to receive and to hold a sufficient amount of material to enable at least some settling of solids to occur. It should be remembered that what flows into the chamber is an enriched liquid/solid mixture (increased solids content per unit volume), and removal of clarified supernatant liquid and its return to the system is to be encouraged.

For this purpose, collection chamber 30 also includes a substantial quiescent region 46 above the level of the exit port. This is most conveniently formed as a downwardly extending skirt 41 from the inlet chamber wall. It joins to a seal 42 at the top of the collection chamber wall. Thus, the solid portion of the material which has passed through the exit orifices can settle, and clarified/or partially clarified supernatant liquid can rise above the exit ports. It is an advantage of this invention that removal of this clarified liquid enables a steadier flow of material through the orifices, including considerably more net solid material per unit time.

To enable this function, a conduit 50 extends from the quiescent region, preferably near the top thereof, to a region of lesser pressure in the vortex.

This device can conveniently be made separable for convenience in servicing it. Arm 51 of the conduit may be welded to the side of the separation barrel, and a second arm 52 rises and passes through an opening 53 in the center of the spin plate. This also serves as a structural joinder for the spin plate so as to space it from the bottom of the separation barrel by the width of the exit port.

The exit port when provided as a slot will be continuous around the separation barrel except where occluded by the conduit.

The upper end of the separation barrel is attached by weldment 55 or if preferred by threads to a flange 56 formed on the outlet barrel. The outlet barrel may conveniently be threaded into a coupling 57 which bears against the outer housing.

The collection chamber is provided with a Joinder flange 60 and a seal which together with a flange 61 on the outer wall of the inlet chamber, enable the collection chamber to be detached. The separation barrel and the outlet barrel can be removed as a unit by unscrewing the outlet tube from the neck. This is a conveniently manufactured and serviced unit.

The vortex is schematically shown in FIG. 1. This device runs flooded without any regions occupied by gases. The flow through is in part the consequence of a differential pressure related to flow velocities.

This separator has many applications. At the present time this separator finds its most attractive use in the removal of solids from solvents used to clean automotive parts. Recycling the solids-laden solvent enables the solvent to be re-used, and the solids to be carried away in a condition suitable for ready disposal.

The dimensions of a suitable separator can readily be determined by the designer, depending on the anticipated volume of mixture to be treated, and on the volumetric through-put rate Instead of a continuous slot, the exit port can be formed as one or a plurality of angularly spaced apart individual openings through the wall of the separation barrel. The term "exit port" is intended to include both an individual port, a plurality of ports, and a continuous slot.

The terms "mixture", and "suspension" are used interchangably, and are intended to define liquid/solid combinations in which the solids can be separated from the liquids by their tendency to separate under centrifugal forces.

This invention is not to be limited by the embodiment shown in the drawings and described in the description, which is given by way of example and not of limitation, but only in accordance with the scope of the appended claims.

I claim:

1. In a separator for separating solids from liquids in a liquid/solid mixture, said separator being of the type which includes a separation barrel having a central axis a lower end, and an interior wall which is an axially-extending surface of revolution, inlet means extending through said wall of said separation barrel to inject the mixture into said separation barrel in a spinning motion, a spin plate in axial adjacency to said lower end of said separation barrel, an exit port from said separation barrel adjacent to said spin plate, a collection chamber having a collection region below said exit port for receiving material which passes through said exit port, and an outlet barrel centrally aligned with said separation barrel axially above the spin plate to receive fluid reflected by said spin plate, the improvement comprising:

said collection chamber further including a quiescent region in said collection chamber above said exit port, and a conduit connecting said quiescent region and a region immediately above the spin plate on the central axis.

2. Apparatus according to claim 1 in which an inlet barrel forms an inlet chamber surrounding an upper portion of said separation barrel, said inlet means comprising ports passing through said separation barrel wall discharging said mixture into said separation barrel in a substantially tangential direction therein.

3. Apparatus according to claim 2 in which said spin plate has an opening therethrough on said central axis, in which said collection chamber surrounds said separation barrel at said exit port, in which said quiescent region surrounds a portion of said separation barrel above said exit port, and in which said conduit rises into said quiescent chamber, and also bends and connects to the opening in the spin plate to open into the separation chamber at the top of said spin plate thereby providing a flow path from said quiescent region to the central portion of the spin plate facing the separation barrel.

4. Apparatus according to claim 2 in which said exit port is a substantially continuous slot formed between said lower end of said separation barrel and the spin plate.

5. Apparatus according to claim 2 in which said conduit and separation barrel are joined to one another, the separation barrel and the outlet barrel are joined to one another, and said outlet barrel and inlet barrel are separably joined to one another.

* * * * *